(12) United States Patent
Richards et al.

(10) Patent No.: US 8,412,957 B2
(45) Date of Patent: Apr. 2, 2013

(54) ENCRYPTION AND DECRYPTION OF RECORDS IN ACCORDANCE WITH GROUP ACCESS VECTORS

(75) Inventors: Ronald W. Richards, Vancouver (CA); Ryan G. Oriecuia, Vancouver (CA)

(73) Assignee: SAP France S.A., Levallois-Perret (FR)

( * ) Notice: Subject to any disclaimer, the term of this patent is extended or adjusted under 35 U.S.C. 154(b) by 971 days.

(21) Appl. No.: 12/335,665

(22) Filed: Dec. 16, 2008

(65) Prior Publication Data

US 2010/0150342 A1     Jun. 17, 2010

(51) Int. Cl.
*H04L 29/06* (2006.01)
*H04L 9/00* (2006.01)
*H04K 1/00* (2006.01)

(52) U.S. Cl. ............... 713/193; 713/168; 726/28

(58) Field of Classification Search .......... None
See application file for complete search history.

(56) References Cited

U.S. PATENT DOCUMENTS

| | | | |
|---|---|---|---|
| 7,950,064 B2 * | 5/2011 | Chavez et al. | 726/28 |
| 2003/0081784 A1 * | 5/2003 | Kallahalla et al. | 380/277 |
| 2007/0140483 A1 * | 6/2007 | Jin et al. | 380/44 |
| 2009/0323961 A1 * | 12/2009 | Sarangdhar et al. | 380/277 |
| 2010/0095118 A1 * | 4/2010 | Meka | 713/168 |
| 2010/0098253 A1 * | 4/2010 | Delerablee | 380/259 |

* cited by examiner

*Primary Examiner* — Shin-Hon Chen
(74) *Attorney, Agent, or Firm* — Buckley, Maschoff & Talwalkar LLC (57) ABSTRACT

According to some embodiments, a system, method, means, and/or computer program code are provided to facilitate an appropriate access to secure information by a plurality of users categorized into a plurality of groups. For example, a group access vector may be determined for each of a plurality of records in a data report, each group access vector including a plurality of indicators that indicate if an associated group is authorized to access that record. It may then be arranged for an encryption key to be assigned to each unique group access vector associated with the data report. It may further be arranged for each record in the data report to be encrypted in accordance with the encryption key assigned to the group access vector of that record, the combined encrypted records comprising an encrypted data report.

15 Claims, 12 Drawing Sheets

| RECORDS | GROUP ACCESS VECTORS | | |
|---|---|---|---|
| | G1 | G2 | G3 |
| 1 | 0 | 0 | 1 |
| 2 | 0 | 0 | 1 |
| 3 | 1 | 1 | 1 |
| 4 | 0 | 1 | 0 |
| 5 | 1 | 0 | 1 |
| 6 | 0 | 1 | 1 |
| 7 | 1 | 0 | 0 |
| 8 | 0 | 0 | 1 |
| 9 | 1 | 0 | 0 |

ENCRYPTION AND DECRYPTION OF RECORDS IN ACCORDANCE WITH GROUP ACCESS VECTORS

FIELD

Some embodiments of the present invention relate to business information, business intelligence, and/or enterprise systems. In particular, some embodiments relate to systems and methods associated with a secure distribution of these and other types of information to different users.

BACKGROUND

An enterprise may distribute information to users. For example, an enterprise may distribute data reports, such as documents, spreadsheets, and other types of information to users. In some cases, it may be appropriate to restrict access to particular types of information to particular types of users. For example, it might be appropriate to let an employee in a human resources department view information about the employment histories and/or salaries of other employees. Similarly, it might be appropriate to let a manager in one department view financial information about that department (but not other departments within the enterprise).

To protect information, an enterprise may encrypt information (e.g., with an encryption key). In this way, only users who are able to obtain an appropriate decryption key may be able to access the information. In such an approach, different encrypted data reports (containing different information) might be created and transmitted to different users to ensure that each user is only able to access information as appropriate. Such an approach, however, can be impractical—especially when there are a substantial number of users and/or types of users. Similarly, the rules governing which users should be allowed to access which information can become complicated and require intensive resources to administer.

It would therefore be desirable to provide improved methods and systems that facilitate a secure distribution of information to users. Moreover, it may be advantageous to provide tools and components that implement such methods and systems in an efficient and practical manner

DETAILED DESCRIPTION

To alleviate problems inherent in the prior art, some embodiments of the present invention introduce systems, methods, computer program code and/or means to encrypt and/or decrypt records in accordance with a group access vector. The records might be associated with, for example, information from one or more business information, business intelligence, and/or enterprise system databases.

Figure 1:
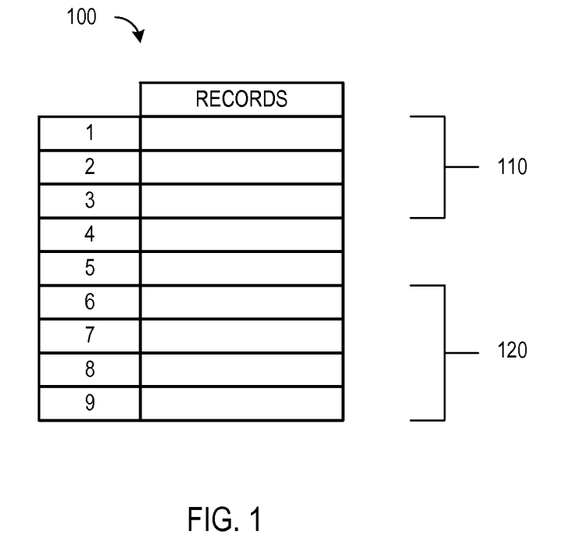
FIG. 1 illustrates a data report including a number of records.

Consider, for example, FIG. 1 which illustrates a data report 100 including a number of records. As used herein, the phrase "data report" may refer to, for example, any database generated report, document, spreadsheet, or data file. The term "record" may refer to any sub-portion of a data report 100, such as a row or column, document section, or record. The data report 100 of FIG. 1 is illustrated has having nine records (1 through 9), although an actual report might include, for example, many thousands of records.

The data report 100 might contain, for example, saved data representing a copy of data in a database at the time the report was run. When the data report 100 has record or row level security, some users may not be permitted to see all of the saved data. For example, records 1 through 3 of the data report 100 might comprise a first portion 110 that can be viewed by a first user (but not a second user) while records 6 through 9 comprise a second portion 120 that can be viewed by the second user (but not the first user).

It may be helpful to send the entire data report 100, with all saved data, to a client or client machine, even when the user of that machine is not authorized to see all the data. For example, it might be easier to send the exact same data report 100 to both a first and second user (even though each user is only authorized to view different portions 110, 120 of the data report 100). That is, according to some embodiments described herein, the entire data report 100 may be sent to both users' computers (and therefore at least some of the records may be under the control of a potentially unauthorized user). Note that it might be assumed any user is potentially hostile, and is able to modify any software that is under the user's direct control (e.g., on the user's computer). Therefore, the software installed on a user's machine might not be trusted to keep the data secret as appropriate.

Figure 2:
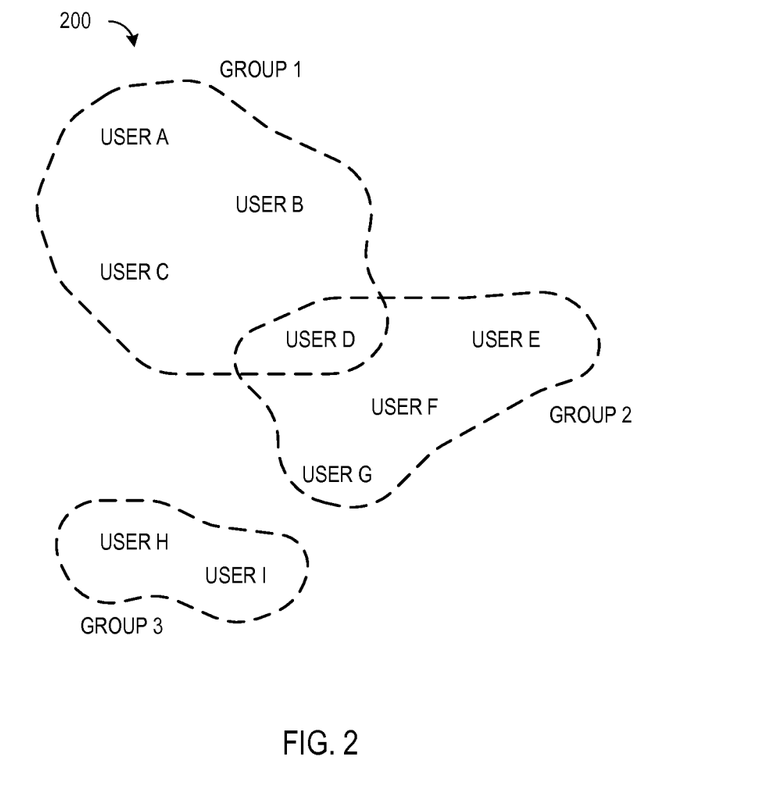
FIG. 2 illustrates users categorized into user groups.

According to some embodiments, record or row level security is based on a set of selection formulas, one per "group," which may take as input a row of data from a database, and produce a Boolean output representing whether or not that group is allowed to see that particular record. As used herein, the term "group" may refer to any categorization of users. Consider, for example, FIG. 2 providing an illustration 200 that includes users A through I categorized into user groups 1 through 3. In particular, group 1 includes users A through D while group 2 includes users D through G. Note that a single user could belong to multiple groups (e.g., user D is a member of both group 1 and group 2). For example, an employee might be both a member of a particular project team and a vice president. That is overlapping groups and/or users may exist in accordance with any of the embodiments described herein.

Since a user may be a member of multiple groups, the permission (or ability to access information) for that user may be represented by the union of the permissions for the groups of which the user is a member. In other words, if any one of the groups a user is a member of permit the user to access a particular record or row in a report, then the user may be allowed to access that particular row. If none of his or her groups permit access, then the user might not be allowed to access the record or row.

For example, a data report may have different types of restrictions defined for the following groups:

> $G_1(R)$ = true (administrators group may be allowed to see all records);
> $G_2(R)$ = level <=3 (members of a human resources group may be allowed to see any salary data for people level 3 and below);
> $G_3(R)$ = level <=3 & area="RD" (Research and Development (RD) managers may be managers allowed to see data for that group; and
> $G_4(R)$ = user <=$user (everyone may be allowed to see his or her own data).

Thus, if a user $U_1$ is a member of groups $G_2$, $G_4$ and $G_5$, (e.g., with $G_5$ representing another group not specifically set forth above) then that user may be allowed to see $U_1(R)=G_2(R)$ OR $G_4(R)$ (with $G_5$ having no effect). Similarly, a user $U_2$ in $G_1$ and $G_4$ may be allowed to see: $U_2(R)=G_1(R)$ OR $G_4(R)$. In other embodiments, a Boolean AND might be used to determine user authorizations.

If a report has restriction formulas for n groups, the group access vector (A) for a row is an n bit vector where bit i of the vector may be the result of the restriction formula $G_i(R)$:

$$A(R)=\{b_i, \ldots, b_n\}=\{G_1(R), \ldots, G_n(R)\}$$

Note that the maximum number of unique group access vector values for a report may be the smaller of $2^n$ (since it is an n-digit binary number) and the number of rows in the report (since each is computed by the row). In many cases, the actual number may be smaller, because many records will often have the same group access vector value.

Figure 3:
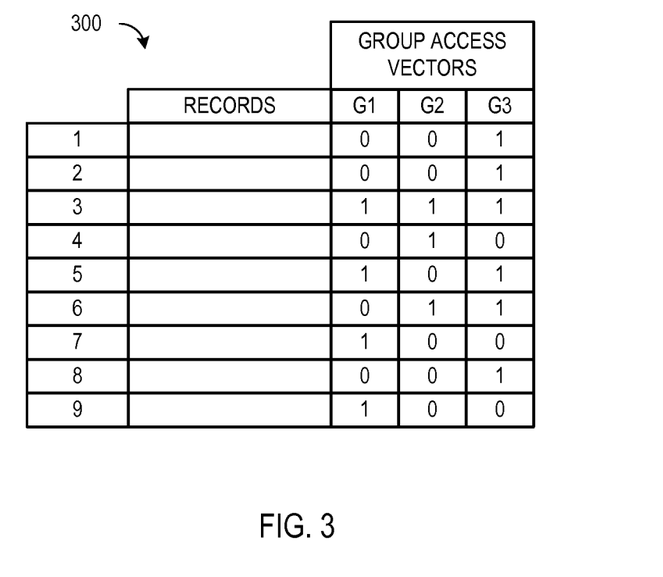
FIG. 3 illustrates a data report and associated group access vectors according to some embodiments of the present invention.

Consider, for example, FIG. 3 which illustrates a data report 300 and associated group access vectors according to some embodiments of the present invention. In particular, the data report 300 has nine records 1 through 9, each of which is associated with a corresponding group access vector that includes three bits (one for each of three groups G1 through G3). For example, record 6 of the data table 300 may be viewable by groups G2 and G3 (as indicated by a "1" in the associated bits of the group access vector) but not by G1 (as indicated by a "0" in the associated bit of the group access vector). Note that records 1, 2, and 8 are associated with identical group access vectors ("{0, 0, 1}").

Figure 4:
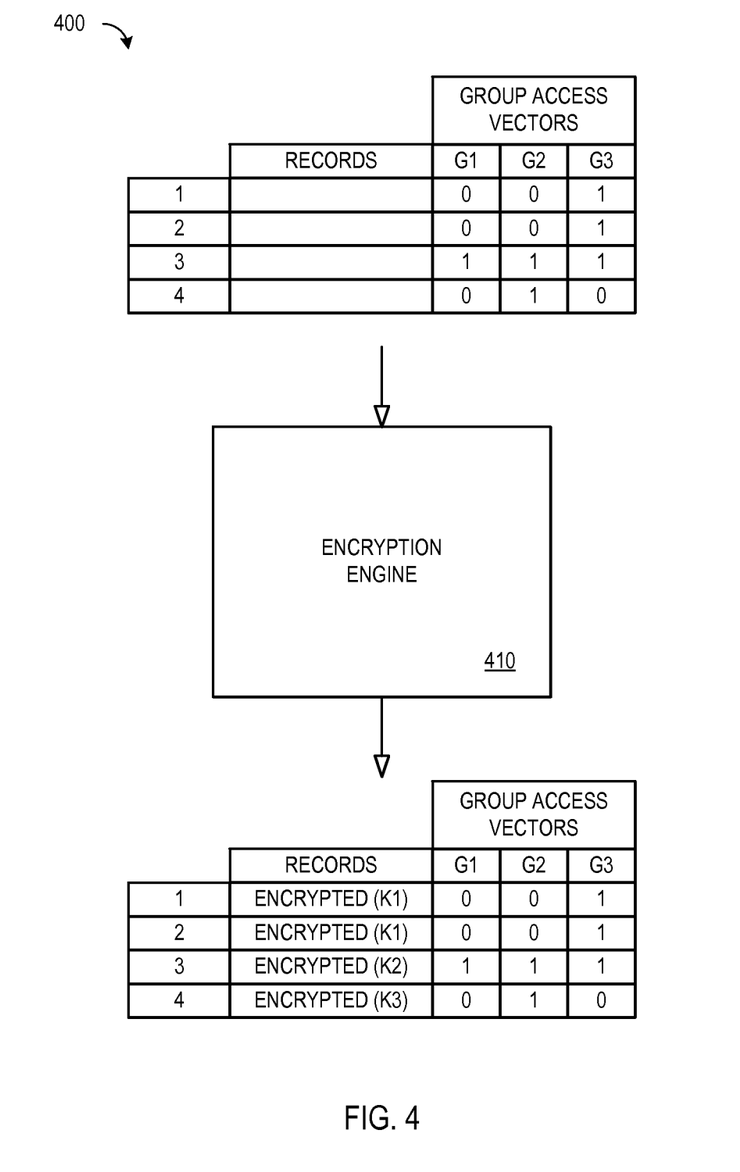
FIG. 4 is a block diagram of a system associated with an encryption engine according to some embodiments.

Consider now, FIG. 4 is a block diagram of a system 400 associated with an encryption engine 410 according to some embodiments. In this case, each unique group access vector value in an input data report might be associated with a randomly-assigned unique encryption key, $K_{A(R)}$. Each record in the saved data for the report may then be encrypted by the encryption engine 410 with the encryption key for that record's group access vector. In the output data for the data report, each record may be prefixed or appended to (or otherwise associated with) that record's group access vector, and then the record data itself may be encrypted using the key for the group access vector:

Saved data record: $\{A(R), Encrypt(R, K_{A(R)})\}$

Note that without the appropriate decryption keys, none of the saved data, R, in this file may be accessed.

In addition to the report file, a separate keys file might be created. This keys file may contain a list of all the groups mentioned in the report, and a mapping from the group access vectors to the decryption keys for each vector. The key file itself could be encrypted with a master key for the entire report. The master key for the report might be stored, for example, in a secure Content Management System (CMS) database. Because the key file is encrypted, even if an authorized user gains access to both the keys file and the report file, he or she may be unable to access any of the data in the report.

Figure 5:
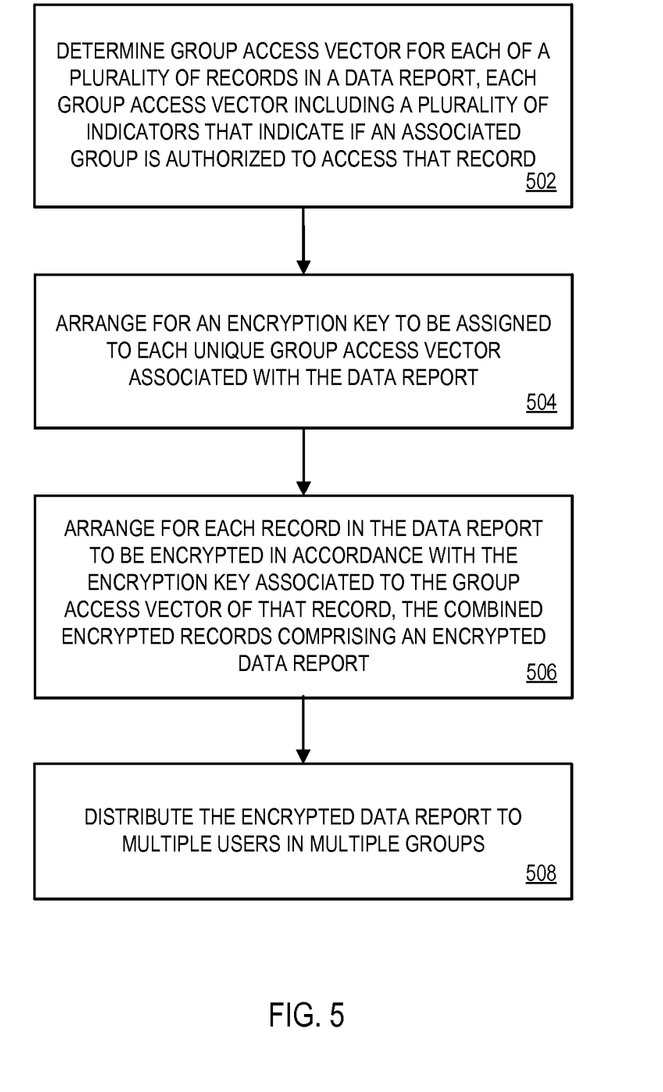
FIG. 5 is a flow diagram of a method associated with encryption of a data report according to some embodiments of the present invention.

FIG. 5 is a flow diagram of a method to facilitate an appropriate access to secure information by a plurality of users categorized into a plurality of groups according to some embodiments of the present invention. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 502, a group access vector may be determined for each of a plurality of records in a data report, each group access vector including a plurality of indicators (e.g., bits) that indicate if an associated group is authorized to access that record. At 504, it may be arranged for an encryption key to be assigned to each unique group access vector associated with the data report.

At 506, it may then be arranged for each record in the data report to be encrypted in accordance with the encryption key assigned to the group access vector of that record, the combined encrypted records comprising an encrypted data report. Note that according to some embodiments, the appropriate group access vector may be appended to each encrypted record in the encrypted data report. According to other embodiments, vectors may be otherwise mapped to each record.

A set of decryption keys associated with the encrypted data report might be gathered, and a master key may then be used to encrypt all of the gathered decryption keys into an encrypted key file. The encrypted key file might be used, for example, when the encrypted data report is later to be viewed by users. At 508, the encrypted data report can be distributed to multiple users associated with multiple groups. The encrypted data report might be sent to the end users by any means, either directly through a secure channel, or through an unsecure channel such as e-mail or File Transfer Protocol (FTP). The encrypted data report may include an identifier of a CMS device and/or a unique identifier associated with the data report itself.

Note that the elements of the method illustrated in FIG. 5 might be performed in any number of different ways. The following represents one example of an algorithm that might be used for writing saved data in accordance with some embodiments of the present invention:

```
// Preconditions:
// records : an array of "Record" data structures, each which
represents a single record of data
// restrictions : an array of { group id, restriction formula } pairs.
Define type Vector as array of (restrictions.count) boolean
Let keys = map< Vector, EncryptionKey >
For i in 1 to records.count
    Define accessVector as Vector
    For g in 1 to restrictions.count
```

-continued

```
        accessVector[g] = restrictions[g].formula ( records[i] )
    next g
    define key as EncryptionKey
    key = map.lookup( accessVector )
    If (key is null)
        Key = RandomKey( )
        Map.store( accessVector, key )
    End if
    Define record as ByteArray
    record = Encrypt( Record, key )
    WriteToDataFile( accessVector )
    WriteToDataFile( record )
next i
For g in 1 to restrictions.count
    WriteToKeysFile( restrictions[g].groupId )
next g
For k in keys.count
    WriteToKeysFile( keys[k].vector )
    WriteToKeysFile( keys[k].key )
Next k
```

Figure 6:
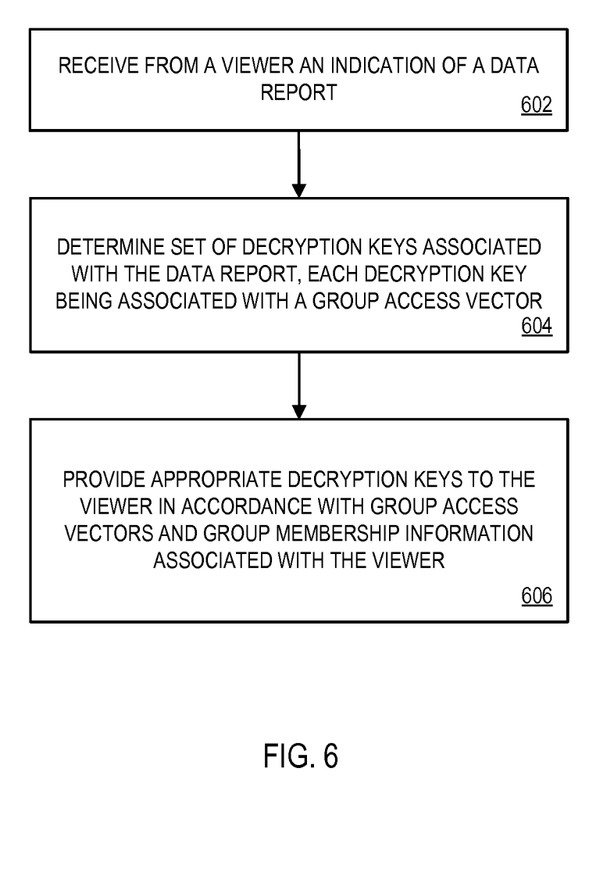
FIG. 6 is a flow diagram of a method associated with access to an encrypted data report according to some embodiments of the present invention.

After the single encrypted data report is transmitted to various user (having different types of access privileges), one or more users may attempt to access information in the report. FIG. 6 is a flow diagram of a method associated with access to an encrypted data report according to some embodiments of the present invention. At 602, an identification of a data report may be received from a viewer. For example, the viewer might provide a user name and password (e.g., to verify his or her identity) along with a report name or identifier.

At 604, an appropriate set of decryption keys associated with the data report is determined (e.g., after decrypting a master key file), each decryption key being associated with a group access vector including a plurality of indicators (e.g., bits) that indicate whether or not an associated group is authorized to use that key. At 606, an appropriate subset of those decryption keys may be transmitted to the viewer in accordance with the group access vectors and group membership information associated with the viewer.

Figure 7:
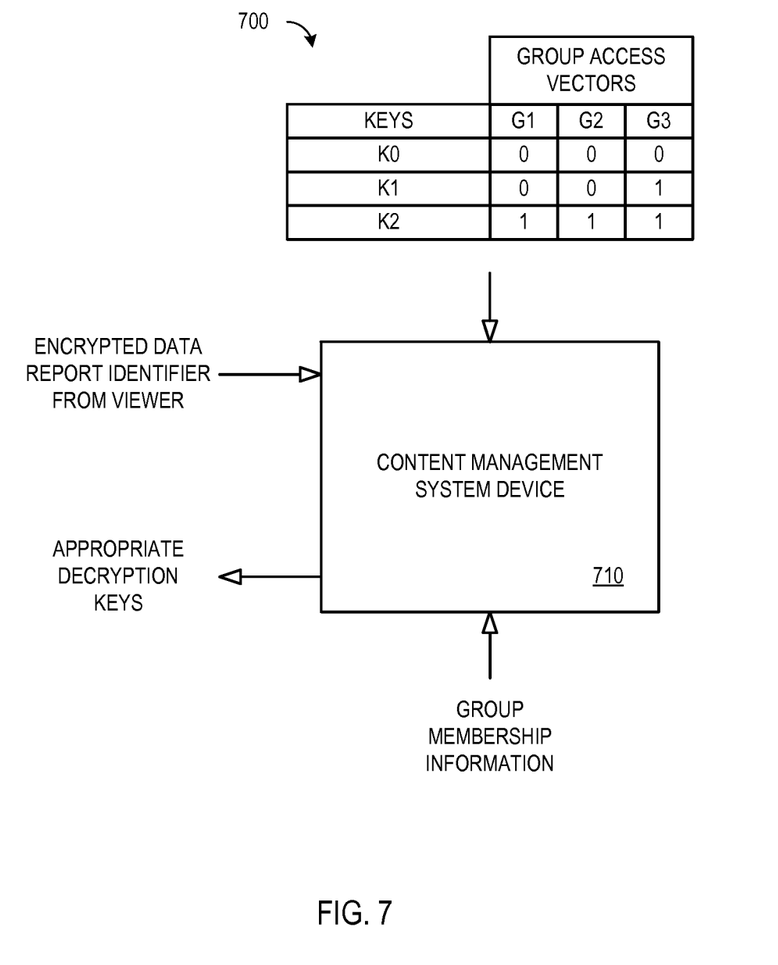
FIG. 7 is a block diagram of a system according to some embodiments.

FIG. 7 is a block diagram of a system 700 according to some embodiments. The system might be associated with, for example, a CMS device 710. When a user attempts to open an encrypted data report, a report viewing application may detect that it is a secure report and require the user to log into the correct CMS device 710. The viewer may then send the data report's unique identifier to the CMS device 710, and request the decryption keys.

The CMS device 710 may first retrieve the master key for this report file from a secure database. The CMS device 710 may then retrieve the keys file for this report, decrypt it in memory, and extract the list of groups from it. For example, FIG. 7 illustrates three keys (K0 through K2) for three different group access vectors.

According to some embodiments, a group membership vector might be generated for the viewer. In this case, it may be determined which decryption keys to provide to the viewer in accordance with a binary intersection of the group membership vector and the group access vectors. For example, the CMS device 710 might determine which of groups the user is a member of and calculate the group membership vector (M). This is an n-bit vector where each bit i in the vector is one if the user is a member of that group, zero otherwise.

$$M(U) = \{b_1, \ldots, b_n\} = \{\text{User is in } G_1, \ldots \text{User is in } G_n\}$$

Note that each bit in the group membership vector might correspond to the same bit in the group access vector (e.g., bit i of the group membership vector means the user is a member of group i, and bit i of the group access vector means the same group i is allowed to access the data of that record).

The CMS device 710 may then go through each group access vector in the keys file, and compute the binary intersection between the group membership vector and that group access vector. If the result of the intersection has at least one bit true, then that may be considered a matching group access vector. All matching group access vectors and their decryption keys may then be transmitted from the CMS device 710 to the viewing application. That is, non-matching group access vectors and decryption keys would not be transmitted. Note that the binary intersection operation might be performed, according to some embodiments, using a bitwise "AND" operation (which may be relatively fast in computer hardware).

Figure 8:
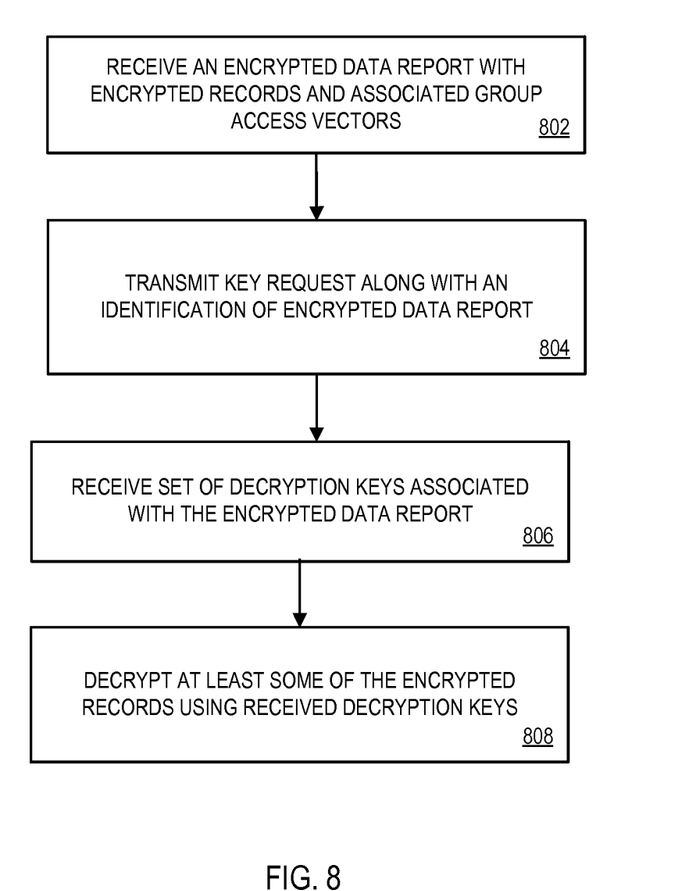
FIG. 8 is a flow diagram of a method associated with viewing an encrypted data report according to some embodiments of the present invention.

FIG. 8 is a flow diagram of a method associated with viewing an encrypted data report according to some embodiments of the present invention. At 802, an encrypted data report (having a plurality of encrypted records and associated group access vectors) is received by a user device. The user device may then transmit a key request along with an identification of the encrypted data report at 804 (e.g., to a CMS device).

At 806, an appropriate set of decryption keys associated with the encrypted data report is received (e.g., from the CMS device). At least some of the encrypted records, associated with appropriate group access vectors, may then be decrypted using the received decryption keys. Note that the elements of the method illustrated in FIG. 8 might be performed in any number of different ways. The following represents one example of an algorithm that might be used reading saved data in accordance with some embodiments of the present invention:

```
// Preconditions and postconditions:
// records : an empty array of "Record" data structures, each which
represents a single record of data. This will be filled.
// keys : a map<Vector, DecryptionKey> of all provided keys
Loop
    Define accessVector as Vector
    Define encrypted Row as ByteArray
    Define key as DecryptionKey
    ReadFromDataFile(accessVector)
    If end-of-file then Exit loop
    ReadFromDataFile( encryptedRow )
    If end-of-file then Exit loop
    key = keys.lookup( accessVector )
    if key is not null then
        Define record as Record
        record = DecryptData( encryptedRow, key )
        records.add( record )
    end if
End loop
```

Figure 9:
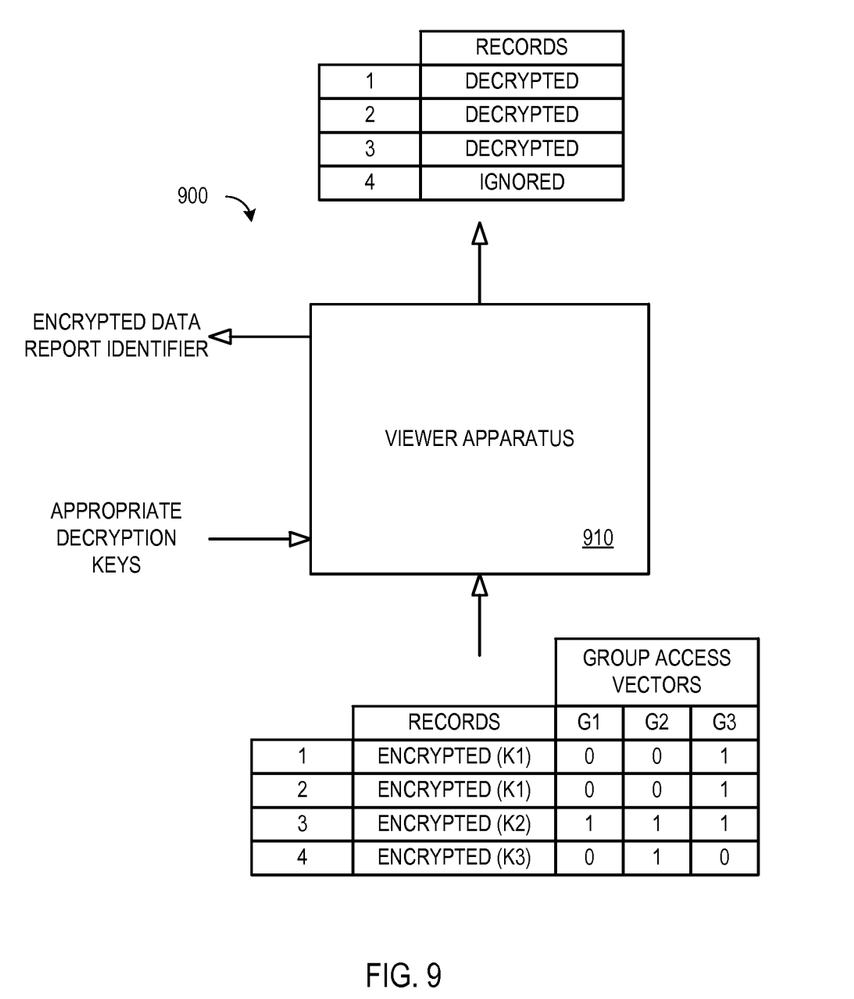
FIG. 9 is a block diagram of a system associated with a viewer apparatus according to some embodiments.

FIG. 9 is a block diagram of a system 900 associated with a viewer apparatus 910 that received an encrypted data report according to some embodiments. In this case, an application executing at the viewer apparatus 910 may ask for and receive a mapping of group access vectors to decryption keys from a CMS device. The viewer apparatus 910 may then store these in a data structure suitable for rapid lookup.

The viewing application may retrieve the saved data for the report. For each record of saved data, the viewing application may examine the group access vector associated with the record, and looks it up in the local data structure. If the corresponding key is found, then the record may decrypted by the viewer apparatus with the key. If the key is not found, the user is not allowed to access that record, and the data may be ignored. For example, record "4" illustrated in FIG. 9 was ignored (that is, was not decrypted) by the viewer apparatus 910. Also note that, according to some embodiments, a multi-record document received by the viewer apparatus 910 might include some records that are encrypted as described herein and other records that are not encrypted at all.

Figure 10:
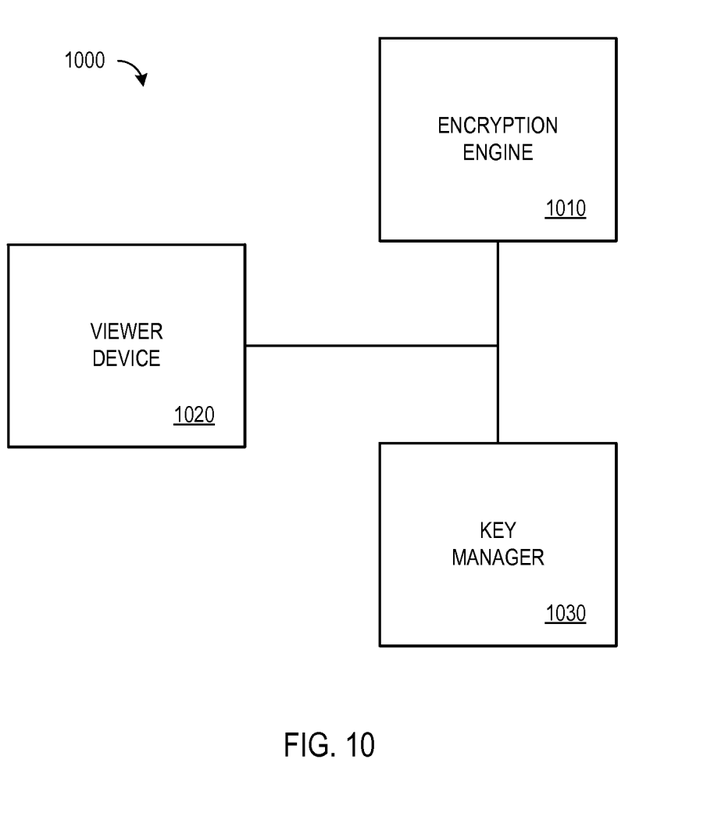
FIG. 10 illustrates a system associated with secure access to data reports in accordance with some embodiments.

FIG. 10 illustrates a system 1000 associated with secure access to data reports in accordance with some embodiments. In particular, the system 1000 may include an encryption engine 1010 (and/or a decryption engine not illustrated in FIG. 10), a viewer device 1020, and a key manager 1030. According to some embodiments, the encryption engine 1010 and key manager 1030 may be co-located and/or incorporated within a single device.

Note that the encryption engine 1010, the viewer device 1020, and/or the key manager 1030 may exchange information via one or more interfaces (e.g., a local interface connection or a communication network interface). Note also that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between devices and/or systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a single encryption engine 1010, viewer device 1020, and key manager 1030 are illustrated in FIG. 10, note that any number of such devices, as well as the other elements described herein, may be provided.

Moreover, some or all of the devices illustrated in FIG. 10 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Note that embodiments are not limited to any specific combination of hardware and software. Moreover, the devices described herein might, for example, support any of the protocols in the following non-exhaustive list: Java Database Connectivity (JDBC), Java Connector (JCO), P4, and Simple Object Access Protocol (SOAP). Moreover, the databases might comprise a relational database accessible via a Structured Query Language (SQL) interface and/or systems which provide intermediary "business intelligence" to data stored within the database.

The encryption engine 1010, viewer device 1020, and/or key manager 1030 might be associated with, for example, a workstation, a Personal Computer (PC), or a mobile wireless device, such as a laptop computer, a Personal Digital Assistant (PDA), a tablet computer, a handheld computer, or any other suitable devices that are or become known.

Figure 11:
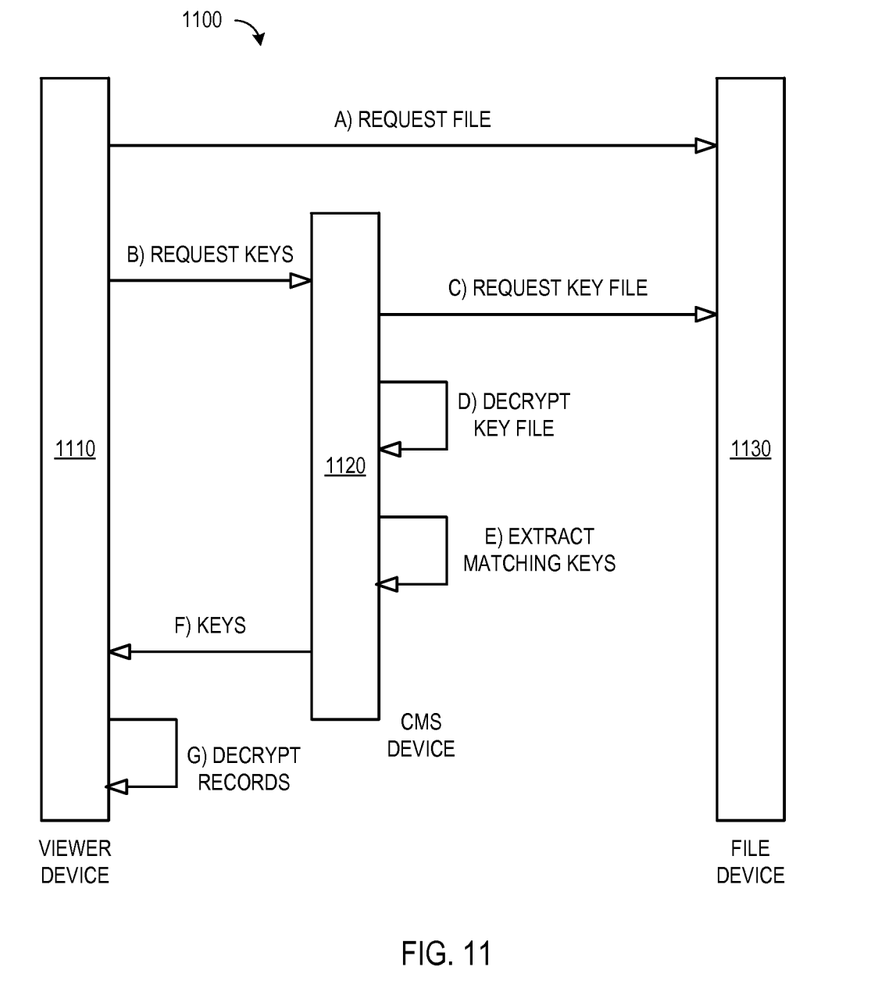
FIG. 11 is an information flow process diagram according to some embodiments of the present invention.

FIG. 11 is an information flow process diagram 1100 according to some embodiments of the present invention. In particular, the diagram 1100 includes a viewer device 1110, a CMS device 1120, and a file device 1130 (e.g., a file server). Some embodiments described herein provide a method to send a document containing confidential data to multiple viewer devices 1110 at (A), each of whom is authorized to see only a subset of the data, according to the security groups of which the viewer is a member. Such an approach may help ensure that the recipients only see the data they are supposed to see, while minimizing the amount of additional data required to provide this security. As a result, saved data can be sent to the client's computer (and therefore be under control of a potentially hostile user), and yet the user is not able to access unauthorized data.

Some embodiments use a group access vector to identify which rows of data a particular user will be able to access, and each row in the saved data for a report may encrypted with an encryption key for that row's group access vector. In addition to the report file, there may be a separate keys file that contains a list of all the groups mentioned in the report, and a mapping from the group access vectors to the decryption keys for each vector. The key file itself might be encrypted with a master key for the entire report stored in a secure CMS database. Because the key file is encrypted, even if an intruder gains access to both the keys file and the report file, the intruder will be unable to access any of the data in the report. The report file may contain, for example, the identifier of the CMS device 1120 where the report is secured, as well as the unique identifier of the report itself.

When a user attempts to open the report, the report viewing application detects that this is a secure report, and requires the user to log into the correct CMS device 1120. The viewer then sends the report's unique identifier to the CMS device 1120 and requests the decryption keys at (B). The CMS first retrieves the master key for this report file at (C) from a secure database at the file device 1130. It then decrypts the keys file for this report at (D). The CMS device 1120 then determines which groups the user is a member of and calculates the group membership vector.

All matching group access vectors and their matching decryption keys are extracted at (E) and sent to the viewer device 1110 at (F). The viewer device 1110 may also get the mapping of group access vectors to decryption keys from the CMS device 1120. For each record of saved data, if the corresponding key is found, then the record is decrypted with the key at (G). If the key is not found, that means the user is not allowed to access that record, and the data is ignored.

Figure 12:
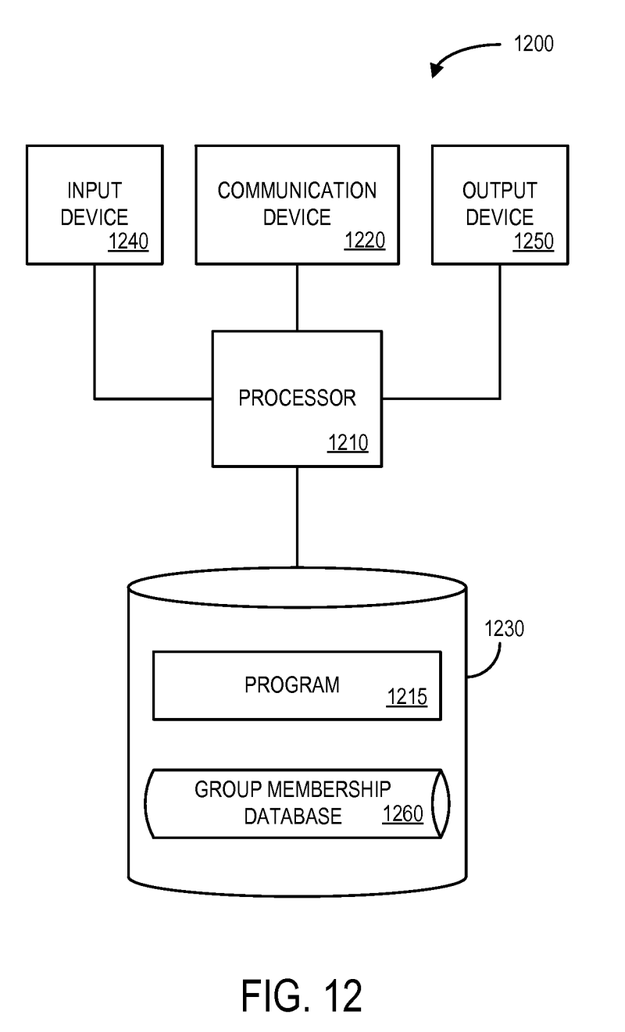
FIG. 12 is a block diagram of an apparatus in accordance with some embodiments of the present invention.

FIG. 12 is a block diagram of an apparatus in accordance with some embodiments of the present invention. The apparatus 1200 might, for example, facilitate the secure transmission of data reports to different users having different access privileges. The apparatus 1200 comprises a processor 1210, such as one or more INTEL® Pentium® processors, coupled to a communication device 1220 configured to communicate via a communication network (not shown in FIG. 12). The communication device 1220 may be used to exchange data reports, keys, and group membership information (e.g., associated with remote databases or other devices).

The processor 1210 is also in communication with an input device 1240. The input device 1240 may comprise, for example, a keyboard, a mouse, or computer media reader. Such an input device 1240 may be used, for example, to provide membership information and/or to select data reports. The processor 1210 is also in communication with an output device 1250. The output device 1250 may comprise, for example, a display screen or printer. Such an output device 1250 may be used, for example, to provide reports and/or display business information to a user.

The processor 1210 is also in communication with a storage device 1230. The storage device 1230 may comprise any appropriate information storage device, including combinations of magnetic storage devices (e.g., hard disk drives), optical storage devices, and/or semiconductor memory devices such as Random Access Memory (RAM) devices, Read Only Memory (ROM) devices, or non-volatile RAM devices (e.g., flash RAM).

The storage device 1230 stores a program 1215 for controlling the processor 1210. The processor 1210 performs instructions of the program 1215, and thereby operates in accordance any embodiments of the present invention described herein.

As used herein, information may be "received" by or "transmitted" to, for example: (i) the apparatus 1200 from other devices; or (ii) a software application or module within the apparatus 1200 from another software application, module, or any other source. As shown in FIG. 12, the storage device 1230 may also store a group membership database 1260 according to some embodiments.

As a result of some of the embodiments described herein, a single report or document containing confidential data might be transmitted to multiple people, each of whom is authorized to see only a subset of the data, according to the security groups of which the viewer is a member. The method may help ensure that the recipients only see the data they are supposed to see, while minimizing the amount of additional data required to ensure this security.

Note that because a viewer's group membership is not determined until the user attempts to view a data report, some embodiments may let the group restrictions to work correctly even for users that did not exist at the time the report was originally processed and/or encrypted.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the applications and databases described herein may be combined or stored in separate systems). Similarly, although particular algorithms, information flows, and user interactions have been given as examples, other and/or additional steps may be performed in accordance with any embodiments described herein. For example, before arranging for each record in a data report to be encrypted, some embodiments may sort the records in the data report based on the associated group access vectors. That is, the saved data may be sorted by the group access vector, and a single group access vector could describe multiple records or rows of data. This may save space by avoiding the repetition of the same group access vector in different row. In addition, this approach may increase the size of individual encrypted blocks of data (and, if the data is compressed before encryption, having a larger block of data may allow for more efficient compression).

Moreover, according to some embodiments, the keys file may be generated and managed by a CMS device (instead of by a report processing agent). In this scenario, a report processing agent might send the group access vector to the CMS device, which would then send back the unique encryption key. The report processing agent could cache the key locally until the report is finished. Such an approach might allow all key management logic to be centralized in the CMS device.

In addition, note that any type of "encryption" might be associated with embodiments described herein, including encoding techniques and/or those associated with single or multiple keys and symmetric or asymmetric encryption. Similarly, although some embodiments are associated with group access vectors that grant permission to access information, other embodiments might instead be associated with group access vectors that deny access (e.g., via "blacklisting")

Applicants have discovered that embodiments described herein may be particularly useful in connection with business intelligence and enterprise information. However, embodiments may be practiced with any type of information include data associated with financial institutions, medical providers, and the like.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate an appropriate access to secure information by a plurality of users categorized into a plurality of groups, that when executed by a processor result in the following:
    determining a group access vector for each of a plurality of records in a data report, each group access vector including a plurality of indicators that indicate which record among the plurality of records an associated group is authorized to access, where the determined group access vector is a Boolean representation based on respective permissions for each user of the plurality of users of the associated group;
    on a group access vector by group access vector basis, arranging for a unique encryption key to be assigned to each unique group access vector associated with the data report;
    arranging for each record in the data report to be encrypted in accordance with the encryption key assigned to the group access vector of that record, the combined encrypted records comprising an encrypted data report;
    distributing the encrypted data report to a user device;
    computing a binary intersection between a group membership vector and the associated group access vector; and
    if the binary intersection includes at least one true bit, decrypting at least a portion of the encrypted data report using decryption keys.

2. The computer-readable medium of claim 1, further comprising:
    appending the appropriate group access vector to each encrypted record in the encrypted data report.

3. The computer-readable medium of claim 1, further comprising:
    gathering a set of decryption keys associated with the encrypted data report; and
    using a master key to encrypt all of the gathered decryption keys into an encrypted key file.

4. The computer-readable medium of claim 1, further comprising:
    distributing the encrypted data report to multiple users associated with multiple groups.

5. The computer-readable medium of claim 1, further comprising:
    prior to arranging for each record in the data report to be encrypted, sorting the records in the data report based on the associated group access vectors.

6. A system to facilitate an appropriate access to secure information by a plurality of users categorized into a plurality of groups, comprising:

an encryption engine configured to:
    determine a group access vector for each of a plurality of records in a data report, each group access vector including a plurality of indicators that indicate which record among the plurality of records an associated group is authorized to access, where the determined group access vector is a Boolean representation based on respective permissions for each user of the plurality of users of the associated group;
    on a group access vector by group access vector basis, arrange for a unique encryption key to be assigned to each unique group access vector associated with the data report;
    arrange for each record in the data report to be encrypted in accordance with the encryption key assigned to the group access vector of that record, the combined encrypted records comprising an encrypted data report;
    distribute the encrypted data report to a user device;
a content management system configured to compute a binary intersection between a group membership vector and the associated group access vector and, if the binary intersection includes at least one true bit, decrypt at least a portion of the encrypted data report using decryption keys.

7. The system of claim 6, further comprising:
the content management system configured to: (i) receive from a viewer an identification of a data report, (ii) determine a set of decryption keys associated with the data report, each decryption key being associated with one of the group access vectors, and (iii) provide the appropriate decryption keys to the viewer in accordance with the group access vectors and group membership information associated with the viewer.

8. The system of claim 6, wherein a decryption key is provided to the viewer even if the viewer was not a member of an appropriate group when the encryption engine encrypted a record associated with that decryption key.

9. The system of claim 6, wherein a decryption key is not provided to the viewer even if the viewer was a member of an appropriate group when the encryption engine encrypted a record associated with that decryption key.

10. The system of claim 6, further comprising:
a group membership database coupled to the content management system.

11. The system of claim 6, further comprising:
a viewer device adapted to: (i) receive from the encryption engine an encrypted data report having a plurality of encrypted records and associated group access vectors; (ii) transmit a key request to the content management system along with an identification of the encrypted data report, (iii) receive from the content management system a set of decryption keys associated with the encrypted data report, and (iv) decrypt at least some of the encrypted records, associated with appropriate group access vectors, using the received decryption keys.

12. A method to facilitate an appropriate access to secure information by a plurality of users categorized into a plurality of groups, comprising:
    determining a group access vector for each of a plurality of records in a data report, each group access vector including a plurality of indicators that indicate which record among the plurality of records an associated group is authorized to access, where the determined group access vector is a Boolean representation based on respective permissions for each user of the plurality of users of the associated group;
    on a group access vector by group access vector basis, arranging for a unique encryption key to be assigned to each unique group access vector associated with the data report;
    arranging for each record in the data report to be encrypted in accordance with the encryption key assigned to the group access vector of that record, the combined encrypted records comprising an encrypted data report;
    distributing the encrypted data report to a user device;
    computing a binary intersection between a group membership vector and the associated group access vector; and
    if the binary intersection includes at least one true bit, decrypting at least a portion of the encrypted data report using decryption keys.

13. The method of claim 12, further comprising:
appending the appropriate group access vector to each encrypted record in the encrypted data report.

14. The method of claim 12, further comprising:
gathering a set of decryption keys associated with the encrypted data report; and
using a master key to encrypt all of the gathered decryption keys into an encrypted key file.

15. The method of claim 12, further comprising:
distributing the encrypted data report to multiple users associated with multiple groups.

* * * * *